(12) United States Patent
Shin et al.

(10) Patent No.: US 6,797,293 B2
(45) Date of Patent: Sep. 28, 2004

(54) ENRICHED MILK WITH CAPSULES CONTAINING NUTRIENTS

(75) Inventors: Young Sup Shin, Kyunggi-do (KR); Gui Hwa Jeong, Kyunggi-do (KR); Soo Jong Kim, Seoul (KR)

(73) Assignee: Binggrae Co., Ltd. (KR)

( * ) Notice: Subject to any disclaimer, the term of this patent is extended or adjusted under 35 U.S.C. 154(b) by 375 days.

(21) Appl. No.: 10/017,032

(22) Filed: Dec. 14, 2001

(65) Prior Publication Data

US 2002/0136809 A1 Sep. 26, 2002

(30) Foreign Application Priority Data

Dec. 15, 2000 (KR) .......................................... 2000-77012
Nov. 21, 2001 (KR) .......................................... 2001-72693

(51) Int. Cl.[7] .............................................. A23C 9/158
(52) U.S. Cl. ............................. 426/72; 426/74; 426/580
(58) Field of Search ............................. 426/72, 73, 74, 426/98, 99, 580

(56) References Cited

U.S. PATENT DOCUMENTS 6,054,128 A * 4/2000 Wakat ........................ 424/765
6,156,354 A * 12/2000 Perlman et al. ................ 426/72
6,447,823 B1 * 9/2002 Shin et al. ..................... 426/42
6,491,955 B1 * 12/2002 Kwak et al. ................... 426/61
6,503,543 B1 * 1/2003 Hudson et al. ............. 424/758

FOREIGN PATENT DOCUMENTS

DE 019653100 A1 * 7/1998
EP 000425423 A2 * 2/1991

* cited by examiner

*Primary Examiner*—Keith Hendricks
(74) *Attorney, Agent, or Firm*—Martine & Penilla, LLP

(57) ABSTRACT

The present invention relates to enriched milk with capsules containing certain nutrients, and the capsule is composed of a primary core which contains the nutrients, a second core layer which surrounds the primary core to prevent loss of the nutrients contained in the primary core and a outer layer which covers the second core layer to maintain the shape of the capsule, and wherein, the specific gravity of the total capsules is adjusted to be equal to that of milk.

According to the present invention, nutrients deficient in milk can be supplemented by the encapsulation and addition of nutrients.

13 Claims, No Drawings

ENRICHED MILK WITH CAPSULES CONTAINING NUTRIENTS

BACKGROUND OF THE INVENTION

1. Field of the Invention

The present invention relates to enriched milk with capsules containing certain nutrients, and more particularly to enriched milk that various nutrients are encapsulated and added to, thereby enabling easy ingestion nutrients deficient in milk.

The value of milk has been recognized since 400 B.C. and milk has been understood as a complete food that provides every component necessary for survival. Milk is also sitologically and nutritionally recognized as a food that promotes health. Milk is consumed in various forms of processed products thereof, as well as by drinking. However, milk doesn't contain sufficient amounts of some vitamins and mineral ingredients such as iron that are needed by the body. Therefore, it is required in USA that milk at a market has to be enriched with vitamin D. Ingredients deficient in milk are vitamins A, $B_1$, C, D and E, folic acid, niacin and iron.

2. Description of the Related Art

There are common milk products enriched with such nutrients as vitamins A and D, iron and DHA, but, because these additives have a bad effect on taste of milk, a large amount of such ingredients can't be added. To solve this problem, it was proposed to make cows naturally produce milk containing the nutrients such as DHA etc., by feeding cows with a feed containing DHA, and so forth. However, there is a problem that much time and costs are required for these cows to produce milk after being fed the feed containing DHA. Korean Patent Disclosure No. 98-40303 proposed the production process of finely coated iron for adding a sufficient amount of iron to milk. However, this method is limited to iron, and has a demerit that the incomplete decomposition of film makes the absorption of iron in the body difficult. There is another method of directly adding vitamins such as vitamin A, folic acid and so on, which are ingredients deficient in body, to milk, but this method has a problem that these ingredients coagulate proteins in milk by reacting with these proteins. Meanwhile, in case vitamin $B_1$ is added to milk, there is a problem that it is degraded while passing through a pasterization process.

The inventor in this invention has endeavored to solve the conventional problems as described above, and has found a way of encapsulating ingredients deficient in milk and adding them to milk, thereby preserving the taste of milk and simultaneously enabling easy ingestion.

SUMMARY OF THE INVENTION

Therefore, the present invention has been made in view of the above problems, and it is an object of the present invention to provide enriched milk with capsules containing a large amount of nutrients required by the body.

DESCRIPTION OF THE PREFERRED EMBODIMENTS

Capsules containing certain nutrients according to the invention are composed of a primary core containing hydrogenated oil which nutrients is dispersed in, a second core layer which surrounds the primary core to prevent loss of nutrients contained in the primary core, and a outer layer which covers the second core layer to maintain the shape of the capsules.

The primary core contains various nutrients that are likely to be deficient in natural milk. Examples of the nutrients include vitamins such as vitamins A, $B_1$, C and D, niacin and folic acid; minerals such as iron and zinc; and functional unsaturated fatty acids such as DHA, EPA and CLA. DHA and EPA among the functional unsaturated fatty acids have beneficial effects enhancing brain function, and thus improving learning ability, and CLA has an effect of reducing body fat.

The primary core can contain one or two or more of the above nutrients. However, it should be understand that the nutrients described above are given for illustration, but are not limitative of the present invention, and that other ingredients may be provided according to functionality of milk. The nutrients are mixed uniformly, and used after being dispersed in hydrogenated oil to prevent loss thereof and enable easy encapsulation. Examples of the hydrogenated oil include a hydrogenated coconut oil and a hydrogenated cottonseed oil. The content of the nutrients of the primary core is 15 to 40% by weight, and preferably 20 to 35% by weight on the basis of weight of the primary core, and the content of the hydrogenated oil is 60 to 85% by weight, and preferably 65 to 80% by weight. The mixing ratio of the nutrients to the hydrogenated oil is 1:1.5 to 1:5.7.

The quantity of the nutrients can be specifically designed according to the age of the population who are intended to drink milk. For example, in case a standard is set as a daily intake of a 4–6 year old child, about 500 ml, the total quantity of nutrients already contained in milk is known. On the basis of this value, the quantity of supplemental nutrients that have to be provided with the diet can be calculated. That is, deficient quantities of nutrients to be supplemented are found by subtracting the daily intake of milk from the recommended daily allowances of the child. This is shown in Table 1.

According to the present invention, the deficient nutrients described in Table 1 are encapsulated and added to milk, thereby enabling easy ingestion of recommended daily allowances of required nutrients by the child.

Also, in case the present invention is applied to different age populations, the ratio of nutrients in capsules and the provided amount of capsules are adjusted by calculating nutrient deficiencies in accordance with the above method.

The present invention is also applicable to various milks such as strawberry milk, chocolate milk, vanilla milk and calcium enriched milk, as well as common white milk.

TABLE 1

| Nutrient | RDA* for 4–6 year old | Total content of nutrients in 500 ml of milk | Deficient quantity |
| --- | --- | --- | --- |
| Vitamin A | 400 µg RE | 118.57 µg RE | 281.43 µg RE |
| Vitamin $B_1$ | 0.8 mg | 0.15 mg | 0.65 mg |
| Vitamin C | 40 mg | 0 mg | 40 mg |
| Vitamin D | 10 µg | 0 µg | 10 µg |
| Niacin | 11 mg NE | 0.52 mg NE | 10.48 mg NE |
| Folic acid | 100 µg | 3.09 µg | 96.91 µg |

*RDA: Recommended Daily Allowance for Korean

The second core layer plays a role in preventing loss of nutrients contained in the primary core when milk is stored at cold or room temperature. Also, it is preferable that material of the second core layer is in liquid phase at body temperature (37° C.) or less, for easy absorption of the nutrients into the body. It is preferable that a material that meets such requirements is not easily oxidized and can maintain it's material properties. Examples of the material include various kinds of hydrogenated oils whose meting point are 25 to 40° C., preferably hydrogenated coconut oil and hydrogenated cottonseed oil. The second core layer also contains lecithin that plays a role as an emulsifying agent to maintain the shape of the capsule.

The outer layer is formed at the outer surface of the capsule and has functions of maintaining the shape of the capsule and protecting the primary core and second core layer. It is preferable that the outer layer is formed of stomach soluble materials dissolvable in gastric acid for easy absorption of the nutrients into the body. Examples of the stomach soluble materials may include gelatin, sorbitol and agar that are dissolved easily in gastric acid at body temperature, but are not limited to those. Meanwhile, the outer layer can be formed by using gelatin and pectin, but, these materials are not dissolved in gastric acid, but are dissolved in the small intestine.

When capsules having a structure described above are added to milk, the specific gravity of the capsules have to substantially equal to that of milk. The reason for this is that when the specific gravity of the capsules is lower than milk, the capsules float and collect at the upper portion of a milk container. On the other hand, when the specific gravity of the capsules is higher than milk, the capsules are deposited on the bottom of a milk container, thereby not being available in most of milk decanted from the container.

The specific gravity of milk is generally in a range of 0.9 to 1.5, though it may depend on ingredients added thereto, and preferably in a range of 1.0 to 1.2. For example, the specific gravity of common milk is about 1.031, strawberry flavored milk is about 1.05 and calcium enriched milk is about 1.032. Therefore, it is preferable that the specific gravity of the total capsules containing the nutrients according to the present invention is also adjusted to the range described above.

The specific gravity of capsules can be adjusted by controlling the contents of the primary core, the second core layer and outer layer. That is, it is accomplished by adjusting the ratio of the core layer with a low specific gravity and outer layer with a high specific gravity.

The nutrients contained in the primary core can comprise vitamin $B_1$ 0.2 to 0.3% by weight, vitamin C 15.02 to 16.05% by weight, folic acid 0.0011 to 0.0013% by weight, niacin 3.97 to 4.12% by weight, vitamin D 0.0029 to 0.0045% by weight, vitamin A 0.06 to 0.15% by weight and the remainder hydrogenated oils. The primary core can also contain one or more functional unsaturated fatty acids selected from the group comprised of DHA, EPA and CLA, and the content is 0.5 to 15% by weight and preferably 2.5 to 10% by weight. It is not preferable that the content of unsaturated fatty acids is out of the above range, because if the content is 0.5% or less by weight, it is difficult to obtain the functional effect, and if the content is 15% or more by weight, it is difficult to form the capsule.

The second core layer comprises hydrogenated oil and lecithin. The content of the hydrogenated oil is 87 to 97% by weight on the basis of the weight of the second layer, and preferably 89 to 95% by weight, and the content of lecithin is 3 to 13% by weight, and preferably 5 to 11% by weight. Examples of hydrogenated oil include hydrogenated coconut oil and hydrogenated cottonseed oil.

The outer layer comprises gelatin, sorbitol and/or agar; and preferably gelatin and sorbitol, at a proportion of 75 to 83% by weight of gelatin and 17 to 25% by weight of sorbitol on the basis of the weight of the outer layer. Sorbitol is added to give shape to amorphous gelatin and for easy dissolution of gelatin in the stomach.

As a proportion of entire capsules, according to the present invention, the primary core, the second core layer and outer layer comprise 25 to 35% by weight, 35 to 45% by weight and 25 to 35% by weight on the basis of the weight of the total capsules, respectively, and preferably 28 to 32% by weight, 32 to 42% by weight and 23 to 33% by weight, respectively. In case the content of the primary core is out of this range, for example, when the content is 25% or less by weight, the primary core may not contain sufficient nutrients, when the content is 45% or more, the second core layer and the outer layer become relatively thin, thus the capsule is easily broken down and dissolved in the mouth before it reaches the stomach.

The diameter of the capsule is preferably in a range of 0.5 to 2.5 mm to allow customers to sense the capsule during drinking. It is not preferable that the diameter is out of this range because in case the diameter is less than 0.5 mm, customers experience difficulty in discriminating capsules from milk, and in case the diameter is more than 2.5 mm, customers feel discomfort due to a feeling that the capsules stick in the throat.

The specific gravity of capsules added to milk will hereinafter be described.

In case the specific gravity of milk is 1.031, it is preferable that the specific gravity of the total capsules is equal to milk to prevent the capsules from either floating to a surface or depositing at the bottom of a container. An example for adjusting the specific gravity to 1.031 is as follows.

In case the primary core comprises vitamin B1 0.25% by weight, vitamin C 15.52% by weight, folic acid 0.0012% by weight, niacin 4.07% by weight, vitamin D 0.0039% by weight, vitamin A 0.11% by weight and the remainder hydrogenated oil, and formed at 30% by weight on the basis of the weight of the total capsules, the specific gravity of the primary core is 0.980. In case the second core layer comprises hydrogenated oil 95% by weight and lecithin 5% by weight, and formed at 40% by weight on the basis of the weight of the total capsules, the specific gravity of the second core layer is 0.890. Also, in case the outer layer comprises gelatin 80% by weight and sorbitol 20% by weight, and formed at 30% by weight on the basis of the weight of the total capsules, the specific gravity of the outer layer is 1.270. In this case, the specific gravity of the total capsules is 1.031.

Meanwhile, a strawberry-flavored milk at a market contains strawberry flavoring 0.1% by weight, and the specific gravity of the milk is 1.05. Furthermore, calcium contents of a calcium enriched milk is 100~500 mg/100 ml, and the specific gravity of the milk is 1.032.

A production process of enriched milk with capsules containing nutrients hereinafter will be described.

Milk used below is not limited to any special kind of milk, and general milk or processed milk is available.

The production process of the milk which capsules are added to is suitable to append an adding process of capsules to the established production process of milk. Suggested methods of adding capsules are: (1) a method of adding only capsules, for example, putting capsules into a milk container and adding sterilized milk thereto; and (2) a method of putting capsules mixed with milk, for example, dispersing capsules into sterilized milk or sugar solution (solution containing sugar), and then mixing with sterilized milk in a production line. The two methods hereinafter will be described, but the detailed description of the production process will be omitted because it is well-known to those skilled in the art.

At first, the method of injecting only capsules comprises the steps of:

(1) filtering and purifying milk to remove impurities and alien substances in milk;
(2) preheating and homogenizing milk to prevent milk from separating and distribute nutrients uniformly;
(3) sterilizing milk to remove microorganisms like an pathogenic microorganism etc.;
(4) cooling milk to maintain the quality of milk;
(5) putting a regular quantity of capsules into a container;
(6) filling the container with milk; and
(7) fixing a cap, packing and storing.

The method of adding capsules mixed with milk comprises the steps of:

(1) filtering and purifying milk to remove impurities and alien substances in milk;
(2) preheating and homogenizing milk to prevent milk from floating and distribute nutrients uniformly;
(3) sterilizing milk to remove microorganisms like an etiologic microorganism etc.;
(4) cooling milk to maintain the quality of milk;
(5) introducing a regular quantity of capsules in a tank filled with milk or sugar solution, and mixing them;
(6) injecting the solution with capsules to mix a fixed amount of the solution on a line going to a packing machine for filling in container.
(7) filling milk mixed with capsules in a container; and
(8) fixing a cap, packing and storing.

The input of capsules can be adjustable according to capsule size, weight and mixing ratio in the above process. For example, in case the weight of a capsule is 0.85 mg (diameter 1.2 mm or so), to meet the RDA for a 4~6 year old child, the input number of capsules into milk is about 890, and 0.15% by weight is input on the basis of 500 ml of milk.

The present invention will hereinafter be described in more detail in conjunction with various embodiments. However, embodiments of the present invention have been disclosed for illustrative purposes, but are not to be construed as limiting claims.

EXAMPLE 1

Production of Capsules for General Milk

The primary core comprised vitamin B1 0.25% by weight, vitamin C 15.52% by weight, folic acid 0.0012% by weight, niacin 4.07% by weight, vitamin D 0.0039% by weight, vitamin A 0.11% by weight and the remainder hydrogenated coconut oil, and was added at an amount of 30% by weight on the basis of total capsule weight. The second core layer comprised hydrogenated coconut oil 95% by weight and lecithin 5% by weight, and was added at an amount of 40% by weight on the basis of total capsule weight. The outer layer comprised gelatin 80% by weight and sorbitol 20% by weight, and was added at an amount of 30% by weight on the basis of total capsule weight. Then, capsules were produced according to well-known production process of capsule. The specific gravity was measured using the gravimeter, and was found to be equal to that of common milk (1.031).

EXAMPLE 2

Production of Capsules for Processed Milk

The primary core comprised vitamin B1 0.22% by weight, vitamin C 13.37% by weight, folic acid 0.032% by weight, niacin 3.51% by weight, DHA 2.87% by weight and remaining hydrogenated coconut oil, and formed at 40% by weight on the basis of total capsule weight. The second core layer comprised hydrogenated coconut oil 95% by weight and lecithin 5% by weight, and formed at 30% by weight on the basis of total capsule weight. And outer layer comprised gelatin 80% by weight and sorbitol 20% by weight, and formed at 30% by weight on the basis of total capsule weight. Then, capsules were produced according to well-known production process of capsule. The specific gravity was measured using the gravimeter, and was found to be equal to that of strawberry-flavored milk (1.05).

EXAMPLE 3

Production of Capsules for Calcium-enriched Milk

The primary core comprised vitamin A 0.52% by weight, vitamin D3 0.16% by weight, vitamin B1 0.18% by weight, vitamin C 9.58% by weight, niacin 2.75% by weight, folic acid 0.035% by weight, DHA 2.87% by weight and remaining hydrogenated coconut oil, and formed at 30% by weight on the basis of total capsule weight. The second core layer and outer layer were the same as example 1, and capsules were produced according to well-known production process of capsule.

The specific gravity was measured using the gravimeter, and was found to be equal to that of calcium-enriched milk (1.032).

EXAMPLE 4

Production of the Milk with Capsules

Enriched milk was produced according to the method of injecting only capsules using capsules produced in example 1. Capsules (0.15% by weight) were added to milk (500 ml) to meet RDA of nutrients for a 4~6 year old child.

EXAMPLE 5

Production of the Strawberry-flavored Milk with Capsules

Strawberry-flavored enriched milk was produced according to the method of injecting only capsules using capsules produced in example 2. Capsules (0.3% by weight) were added to strawberry-flavored milk (200 ml) to meet RDA of nutrients for a 4~6 year old child.

EXAMPLE 6

Production of the Calcium-enriched Milk Containing Capsules

Calcium-enriched milk was produced according to the method of injecting only capsules using capsules produced in example 3. Capsules (0.28% by weight) were added to strawberry-flavored milk (500 ml) to meet RDA recommended for a 4~6 year old child.

TEST EXAMPLE 1

Sensory Evaluation Assay

Sensory evaluation was carried out by panels of 44 persons using enriched milk produced in example 4 or 6. As test subjects, adults of either sex that could identify preferences for milk and confirm significance of sensory evaluation, were chosen.

The result of the sensory evaluation is described in the following Tables 2 to 4. As shown in the tables described below, it is found that enriched milk according to the present invention is preferred to common milk.

TABLE 2

| Preferred type of milk | preference (number of persons) | Rate |
|---|---|---|
| Enriched milk of embodiment 4 | 28 | 64% |
| Common milk | 9 | 20% |
| No preference | 7 | 16% |
| Total | 44 | 100% |

TABLE 3

| Preferred type of milk | preference (number of persons) | Rate |
|---|---|---|
| Enriched milk of embodiment 5 | 32 | 73% |
| Common milk | 5 | 11% |
| No preference | 7 | 16% |
| Total | 44 | 100% |

TABLE 4

| Preferred type of milk | preference (number of persons) | Rate |
|---|---|---|
| Enriched milk of embodiment 6 | 35 | 80% |
| Common milk | 3 | 7% |
| No preference | 6 | 13% |
| Total | 44 | 100% |

According to the present invention, nutrients deficient in milk are encapsulated and added to milk for maintaining the excellent taste in the sensual aspect, and easy intake of various nutrients. Therefore, the consumption of milk is promoted and sales of a diary farmer increased. Furthermore, the present invention may contribute to the national health.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An enriched milk with capsules, said capsule comprising;

a primary core containing hydrogenated oil in which nutrients are dispersed;

a second core layer which surrounds the primary core to prevent loss of nutrients contained in the primary core, wherein the second core layer comprises hydrogenated oil and lecithin; and an outer layer which covers the second core layer to maintain the shape of the capsules, wherein the outer layer comprises two or more materials selected from the group consisting of gelatin, sorbitol and agar.

2. The enriched milk as set forth in claim 1, wherein the specific gravity of the total capsules is equal to milk.

3. The enriched milk as set forth in claim 2, wherein the specific gravity of the total capsules is in a range of 0.9 to 1.5.

4. The enriched milk as set forth in claim 1, wherein the primary core, the second core layer and the outer layer are 25 to 35% by weight, 35 to 45% by weight and 25 to 35% by weight on the basis of the weight of the total capsules, respectively.

5. The enriched milk as set forth in claim 1, wherein the mixing ratio of the nutrients of the primary core and the hydrogenated oil is 1:1.5 to 1:5.7.

6. The enriched milk as set forth in claim 1, wherein the nutrients include one or more selected from the group consisting of vitamins A, $B_1$, C and D, niacin and folic acid and one or more selected from the group consisting of iron and zinc.

7. The enriched milk as set forth in claim 1, wherein the nutrients also comprise one or more of functional unsaturated fatty acids selected from the group consisting of DHA, EPA and CLA.

8. The enriched milk as set forth in claim 7, wherein the content of the functional unsaturated fatty acids is 0.5 to 15% by weight on the basis of the weight of the primary core.

9. The enriched milk as set forth in claim 1, wherein the hydrogenated oil of the primary core are one or more selected from the group consisting of hydrogenated coconut oil and hydrogenated cottonseed oil.

10. The enriched milk as set forth in claim 1, wherein the content of the hydrogenated oil is 89 to 97% by weight on the basis of the weight of the second core layer, and the content of the lecithin is 3 to 13% by weight on the basis of the weight of the second core layer.

11. The enriched milk as set forth in claim 1, wherein the hydrogenated oil is one or more selected from the group consisting of hydrogenated coconut oil and hydrogenated cottonseed oil.

12. The enriched milk as set forth in claim 1, wherein the content of the gelatin is 75 to 83% by weight on the basis of the weight of the outer layer, and the content of the sorbitol is 17 to 25% by weight on the basis of the weight of the outer layer.

13. The enriched milk as set forth in claim 1, wherein the diameter of the capsule is in a range of 0.5 to 2.5 mm.

* * * * *